UNITED STATES PATENT OFFICE.

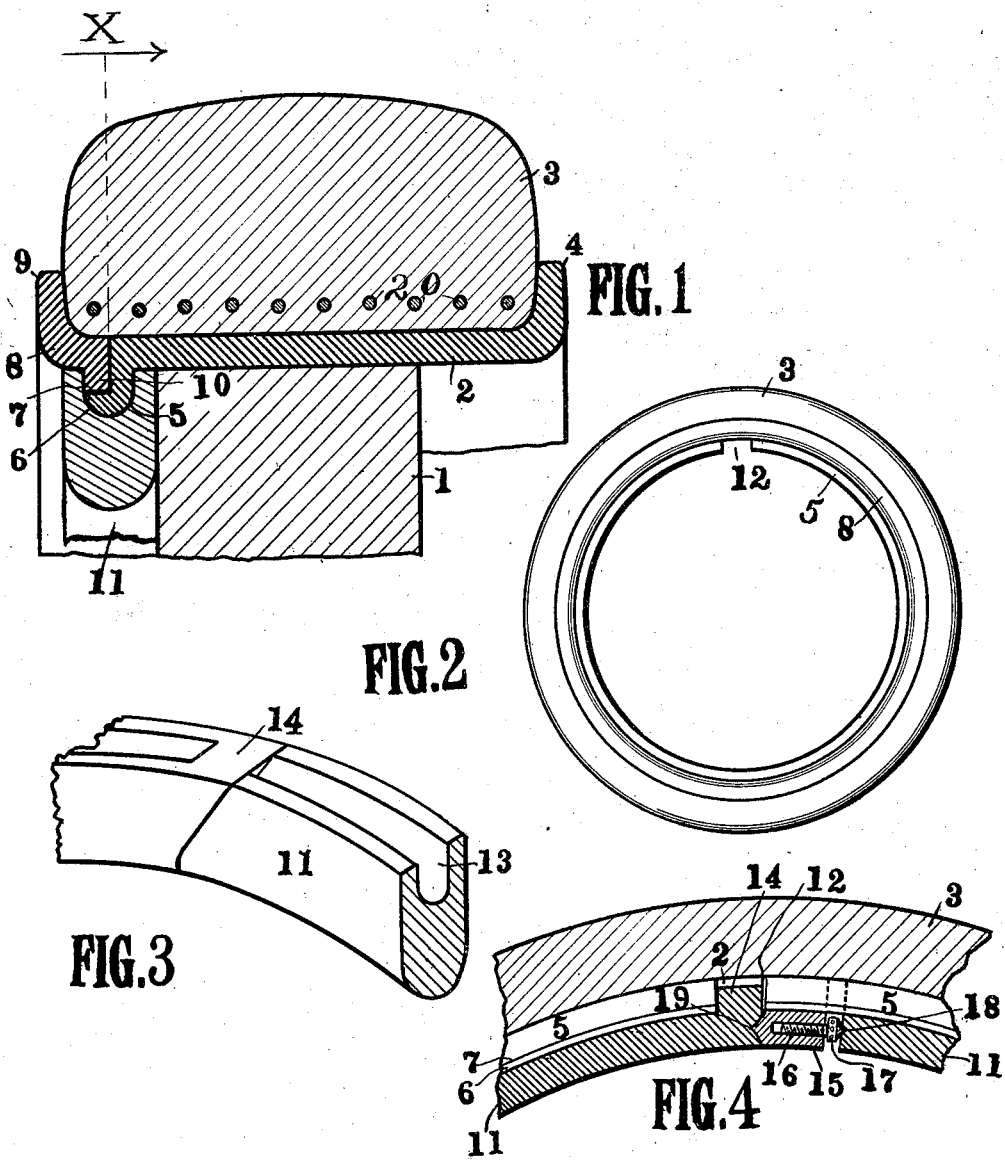

JOHN M. ALDERFER, OF SHARON CENTER, OHIO.

VEHICLE-WHEEL RIM.

944,351.

Specification of Letters Patent. Patented Dec. 28, 1909.

Application filed November 7, 1908. Serial No. 461,567.

*To all whom it may concern:*

Be it known that I, JOHN M. ALDERFER, a citizen of the United States, residing at Sharon Center, in the county of Medina and State of Ohio, have invented new and useful Improvements in Vehicle-Wheel Rims, of which the following is a specification.

This invention has relation to new and useful improvements in vehicle wheel rims and has especial relation to that type known as "quick detachable" wherein the rim is provided with at least one removable tire-retaining element to permit the lateral withdrawal of the tire, as contradistinguished from that type of rim wherein it is necessary to stretch the tire over one of the lateral tire-retaining edges or flanges.

The object of this invention, broadly speaking, is to construct a vehicle wheel rim with a seat having a flange along one of its lateral edges constituting a tire-holding and retaining means, said retaining-means adapted to coöperate with a removable tire-retaining means on the opposite side of the rim which is held in position by a new and improved locking means.

A further object of this invention is to construct a new and improved locking device for the detachable tire-retaining member when in association with a tire and rim, said device adapted to be fixedly-secured in position by suitable mechanism and when so positioned to securely hold the removable portion or member of the rim in suitable cooperation with both the tire and rim.

With the foregoing and other objects in view, the invention consists in the novel construction, combination and arrangement of parts constituting the invention to be hereinafter specifically described and illustrated in the accompanying drawings which form a part hereof wherein is shown the preferred embodiment of the invention, illustrated by way of example in connection with a wheel on which is mounted a solid tire of ordinary construction, but it is to be understood that changes, variations and modifications can be resorted to which come within the scope of the claims hereunto appended.

In the drawings, in which similar reference numerals indicate like parts in the different figures: Figure 1 is a cross-sectional view of a rim and tire-portion of a wheel constructed in accordance with this invention, also showing in section my improved locking device for detachably securing the retaining means to the rim and in coöperation therewith, said retaining means arranged in operative relation with respect to the rim on which is mounted a common form of tire, said rim provided with outwardly-projecting lateral flanges. Fig. 2 is a view in side elevation of the rim-portion of a vehicle wheel embodying this invention on which is mounted a tire such as is shown in Fig. 1, with the locking means for securing the detachable tire-retaining means, removed therefrom. Fig. 3 is a perspective view of a portion of the locking device, showing the abutting ends thereof; and, Fig. 4 is a vertical, sectional view of a rim and tire-portion of a wheel constructed in accordance with this invention, approximately on line X of Fig. 1, also showing in section an improved device for holding the locking device securely in position.

Referring to the drawings in detail, the reference numeral 1 denotes a wheel felly on which is mounted an annular rim 2, the outer face of which constitutes a seat for a tire 3 and having along one of its lateral edges an outwardly-projecting flange 4 formed integral therewith and adapted to constitute a fixed tire-retaining means. The rim 2 has along its opposite edge a depending or inwardly-extending flange 5, preferably of the general contour shown in Fig. 2, with a laterally-extending bead 6, the outer face 7 of which is adapted to constitute a seat, for a purpose to be hereinafter described.

Arranged to coöperate with the rim 2 is an endless, annular tire-retaining member 8 the inner face of which is adapted to engage the lateral portions of a tire mounted on the rim 2 and provided with an outwardly-extending flange 9 corresponding in general contour to the flange 4 of the rim 2 and further provided on its inner face with a depending flange 10, the inner face of which is adapted to abut against the lateral face of the flange 5 and its inner edge adapted to rest on the shoulder 7 of the bead 6, whereby when positioning the same it may be slipped laterally over the shoulder 7 and rest in abutting relation with the outer face of the flange 5, with the outer projecting tire-retaining flanged portion thereof engaging the lateral portion of the tire 3.

The locking means for retaining the member 8 in position consists of a resilient split ring 11, preferably formed with a U-shaped circumferential recess in the outer face thereof and self-expansive in that it will return to its normal shape when temporarily distorted during the seating thereof.

In setting up a wheel rim such as is shown in Fig. 1, the tire 3 which is preferably made annular and provided with embedded circumferentially-extending retaining-wires 20, is slipped laterally onto its seat on the outer face of the rim 2 until one of its lateral faces is in engaging or abutting relation with the flange 4. The complementary member 8 is then seated by passing it laterally into position with the inner edge thereof resting on the shoulder 7 of the bead 6. The locking ring 11 is then sprung into position by first bending inwardly one of the ends thereof sufficiently to permit the opposite end to be seated by inclosing the abutting flanges 5 and 10 of the members 2 and 8 and afterward the balance of the ring is gradually forced into clamping engagement, this being aided by the self-expansible or resilient nature of the ring.

Experience has shown that the annular tire-retaining member 8, unless engaging the tire with sufficient pressure to prevent movement thereof, will have a constant tendency to move circumferentially on its seat 7 of the bead 6 of the flange 5, and in order to prevent this, a notch 12 is cut through both the flanges 5 and 10, as clearly shown in Fig. 2. The ring 11 is preferably made as shown in Fig. 3, with the line of severance formed obliquely to a radius of the wheel and with the channel or circumferential recess formed therein interrupted at the point 14. In positioning the locking means shown in Fig. 3, the interrupted or solid portion 14 of the ring is inserted in the notch 12 of the flanges 5 and 10 and the balance of the ring sprung into position, as has been described with respect to the locking ring in Fig. 1. It will be seen that the interrupted portion 14 at the end of the recess 13 being inserted in the registering notches 12 of the flanges 5 and 10 will act as a key and prevent circumferential movement of the complementary member 8 with respect to the rim 2.

The resilient nature of the split locking ring 11, aided by the centrifugal force exerted thereon by the rapid revolution of the wheel on which the same is employed, is ordinarily sufficient to hold this member securely in position, but experience has demonstrated that it is safer to employ an auxiliary or positive lock therefor and a preferred form of this device is illustrated in Fig. 4 and comprises a comparatively short member 15 having its exterior surface corresponding in contour to the exterior conformation of the locking ring 11 and with a recess 13 formed therein to receive the abutting and coöperating flanges 5 and 10 of the rim and tire-retaining member. This member is also provided with a threaded opening in which is mounted an exteriorly-threaded shaft 16 provided with a head 17 having a preferably conically-formed end 18 adapted to enter and be received in a depression or recess in one end of the locking ring 11. The rear end of the member 15 is preferably formed with a protuberance 19 adapted to enter a recess in the opposite end of the locking ring 11. When employing this positive locking device for securing the locking ring in position, the latter is usually made so that there is sufficient space between the severed ends thereof to permit the placing of the member 15 therebetween, and it will be noted that as the member 15 is provided with a longitudinal recess to receive the flanges 5 and 10, it is held firmly against displacement and will conform substantially to the general contour of the ring 11. In using the member 15 the parts are assembled as has been described with reference to Fig. 1 with the severed ends of the locking ring 11 spaced apart sufficiently to permit the insertion of the member 15 between them, after which the ends of the ring 11 are forced apart and into snug and clamping engagement with the flanges 5 and 10 by manipulating the threaded shaft 16 which is readily done by inserting a proper tool in apertures in the head 18 which causes the threaded shaft to move outwardly from the member 15 and force the ends of the locking ring 11 apart.

It will be obvious of course that the rim and complementary tire-retaining member associated therewith may be provided with any form of tire-retaining flanges, instead of the form shown in Fig. 1 and still be entirely within the scope of this invention.

What I claim and desire to secure by Letters Patent, is:—

1. The combination in a vehicle wheel, of a rim provided with a seat for a tire and a tire-retaining means along one side edge thereof, said rim provided with a depending or inwardly-extending flange along its opposite side edge having a notch formed therein, an annular-removable tire-retaining means coöperating with the tire-retaining means on said rim provided with an inwardly-extending flange having a notch therein adapted to register with the notch in the depending flange of said rim, said removable tire-retaining means adapted to be positioned with the depending flange thereof in abutting relation with the face of the depending flange of said rim and a locking element comprising a split, resilient ring having a circumferentially-arranged interrupted recess in the outer face thereof adapted to be sprung over and receive the abutting inwardly-depending flanges of said rim and removable tire-retaining means with the interrupted portion thereof positioned in the registering notches of said flanges, whereby said removable tire-retaining means is locked against circumferential movement.

2. The combination in a vehicle wheel, of a rim provided with a seat for a tire and a tire-retaining means along one side edge thereof, said rim provided with a depending or inwardly-extending flange having a laterally-projecting bead along its inner edge, the outer face of said bead constituting a seat, said flange and bead having a notch formed therein, an annular removable tire-retaining means coöperating with the tire-retaining means on said rim provided with an inwardly-extending flange having a notch therein adapted to register with the notch in the depending flange of said rim, said removable tire-retaining means adapted to be positioned with the depending flange thereof in abutting relation with the face of the depending flange of said rim and mounted on the seat on said bead and a locking element comprising a split, resilient ring having a circumferentially-arranged interrupted recess in the outer face thereof adapted to be sprung over and receive the abutting inwardly-depending flanges of said rim and removable tire-retaining means with the interrupted portion thereof positioned in the registering notches of said flanges, whereby said removable tire-retaining means is locked against circumferential movement.

3. The combination in a vehicle wheel, of a rim provided with a seat for a tire and a tire-retaining means along one side edge thereof, said rim provided with a depending or inwardly-extending flange along its opposite side edge having a notch formed therein, an annular removable tire-retaining means coöperating with the tire-retaining means on said rim provided with an inwardly-extending flange having a notch therein adapted to register with the notch in the depending flange of said rim, a split, resilient locking ring having the ends thereof spaced apart and provided with a circumferentially-arranged recess in the outer face thereof adapted to be sprung over and receive the abutting inwardly-depending flanges of said rim and removable tire-retaining means, a member provided with a recess to receive said abutting flanges adapted to be interposed between the separated ends of said ring, suitably mounted therebetween and a threaded element projecting therefrom adapted to engage one end of said locking ring when said threaded element is rotated in one direction for positively expanding said locking ring into clamping engagement with said flanges.

4. The combination in a vehicle wheel, of a rim provided with a seat for a tire and a tire-retaining means along one side edge thereof, said rim provided with a depending or inwardly-extending flange along its opposite side edge having a notch formed therein, an annular removable tire-retaining means coöperating with the tire-retaining means on said rim provided with an inwardly-extending notched flange, said removable tire-retaining means adapted to be positioned with the depending flange thereof in abutting relation with the face of the depending flange on said rim and with the notch therein in registering relation with the notch of the flange of said rim, a locking element comprising a split, resilient ring with the ends thereof normally spaced apart having a circumferentially-arranged interrupted recess in the outer face thereof adapted to be sprung over and receive the abutting inwardly-depending flanges of said rim and removable tire-retaining means and with the interrupted portion thereof positioned in the registering notches of said flanges, whereby said removable tire-retaining means is locked against circumferential movement and a detachable member provided with a recess to receive said abutting flanges and with an expansible element mounted therein arranged to be positioned between the spaced ends of said ring for forcing said ends apart and the balance of said ring into clamping engagement with the abutting flanges of said rim and tire-retaining means.

5. The combination in a vehicle wheel, of a rim provided with a seat for a tire and a tire-retaining means along one side edge thereof, said rim provided with a depending or inwardly-extending flange along its opposite side edge having a notch formed therein, an annular removable tire-retaining means coöperating with the tire-retaining means on said rim provided with an inwardly-extending notched flange, said removable tire-retaining means adapted to be positioned with the depending flange thereof in abutting relation with the face of the depending flange on said rim, with the notch therein in registering relation with the notch in the flange of said rim, a locking element comprising a split, resilient ring with the ends thereof normally spaced apart having a circumferentially-arranged interrupted recess in the outer face thereof adapted to be sprung over and receive the abutting inwardly-depending flanges of said rim and removable tire-retaining means with the interrupted portion thereof positioned in the registering notches of said flanges, whereby said removable tire-retaining means is locked against circumferential movement and a removable member comprising a body portion conforming exteriorly to the configuration of said locking ring, having a longitudinal recess to receive the abutting flanges of said rim and tire-retaining means and further provided with a threaded opening adapted to receive a threaded shaft arranged when extended to force the spaced ends of said locking element apart and into clamping engagement with the flanges of said rim and removable tire-retaining means.

6. The combination in a vehicle wheel, of a rim provided with a seat for a tire and a tire-retaining means along one side edge thereof, said rim provided with a depending or inwardly-projecting flange along its opposite side edge, an annular removable tire-retaining means coöperating with the tire-retaining means on said rim provided with a depending or inwardly-projecting flange adapted to be positioned in abutting relation with the face of the depending or inwardly-projecting flange of said rim, a locking element comprising a split resilient ring the ends whereof are normally spaced apart provided with a circumferentially-arranged groove in the outer face thereof adapted to be sprung over and inclose the abutting depending or inwardly-projecting flanges of said rim and removable tire-retaining means and an expansible member positioned between the spaced ends of said element for positively forcing said ends apart for causing the balance of said element to clamp said abutting flanges for detachably holding said tire-retaining means in coöperative relation with said rim.

In testimony whereof I have hereunto set my hand in presence of two subscribing witnesses.

JOHN M. ALDERFER.

Witnesses:
C. E. HUMPHREY,
GLENARA FOX.